Aug. 23, 1932.  D. W. ROPER  1,872,818
IMPREGNATED PAPER INSULATED, LEAD COVERED CABLE
Filed June 1, 1931
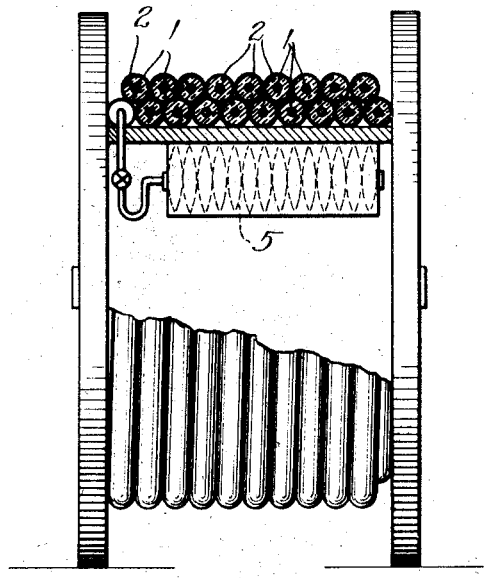
Inventor:
Denney W. Roper.
By
Attys.

Patented Aug. 23, 1932

1,872,818

UNITED STATES PATENT OFFICE

DENNEY W. ROPER, OF CHICAGO, ILLINOIS

IMPREGNATED PAPER INSULATED, LEAD COVERED CABLE

Application filed June 1, 1931. Serial No. 541,137.

My invention relates in general to high voltage, impregnated insulated cables, and more particularly to cables of the so-called ordinary type of impregnated paper insulation as distinguished from the oil-filled type.

The oil-filled type of cable is distinguished from the ordinary type by having lateral channels for the impregnating oil. In single-conductor cable this may conveniently take the form of a hollow core in the center of the stranded conductor. After a thorough evacuation and drying of the insulation by methods well known to the art, the cable is filled with an insulating oil that is fluid at all temperatures to which it will be exposed during operation. The sections of cable are connected in the field with suitable joints and including, at intervals, stop joints which act as a barrier to the flow of the oil but provide continuity of the conductor. The impregnating oils suitable for the purpose all have a thermic co-efficient of expansion considerably higher than that of the lead sheath. Suitable oil reservoirs are accordingly connected at intervals to the oil channel in the oil-filled cable and provide facilities for the oil to leave the cable and enter the tank as the temperature increases, with a flow in the reverse direction as the temperature of the cable falls. In this manner, the very thorough impregnation of the insulation is maintained under all conditions of temperature whether due to changes in load or to seasonal changes. The continuous pressure on the oil within the cable precludes the formation of voids which are the cause of its deterioration and failure.

The cable sheaths are universally made of commercially pure lead or one of the common alloys, as this has been found the most suitable material for the purpose. Lead sheath, however, is subject to plastic flow and the tensile stress on the lead sheath due to the internal pressure must be kept below 200 pounds per square inch of lead, which corresponds, roughly to an internal pressure of about 20 pounds per square inch on the oil with the cable diameters and lead sheath thicknesses in common use. In the oil-filled type of cable the first installations were made with a reinforced sheath, but later improvements have permitted the system to be designed so as to keep the internal oil pressure safely within this 20-pound limit at which stretching of the lead sheath will occur if the pressure is long maintained.

In the manufacture of high-voltage, single-conductor cable with the ordinary type of insulation, a metal shielding tape is sometimes wrapped around the exterior of the insulation over the conductor before application of the lead sheath, the object being to prevent ionization between the outer surface of the insulation and the lead sheath when the sheath is distended by long-continued pressure due to the temperatures incident to load current. When the sheath is distended, however, the space between the sheath and the insulation is found to be filled with impregnating oil which has been forced out of the interior of the insulation by the expansion due to the increase of temperature. The amount of voids within and throughout the insulation have been increased by an amount corresponding to the amount of the oil which is found between the outer surface of the insulation and the lead sheath. The metal shielding tape wrapped around the outside of the insulation, therefore, fails to prevent the ionization of the insulation where it is most harmful, that is, throughout the body of the insulation.

With the ordinary type of insulation the impregnation is never quite perfect; voids occur throughout the insulation due to the thermic contraction of the impregnating compound, and additional voids are formed by the bending of the cable while wrapping it on the reel or during installation. I have found that 4% entrained air or 1% entrained oxygen will bring about the deleterious effects which cause the form of deterioration which has been termed "ionization". As a result of this condition, ordinary type of insulation in high voltage cable containing air is operated at a maximum stress of 50 volts per mil in this country, while oil-filled insulation is operating at 108 volts per mil without any signs of instability of the insulation and in addition oil-filled insulation has been operated experimentally at 156 volts per mil without any signs of instability or deterioration. The ordinary type of insulation for operation at 66 kv. is now limited to a maximum temperature of 65° C., while the oil-filled type for the same voltage may be operated at 70° C. and temperatures of 75° and 80° C. are being considered.

The object of my invention is to eliminate the residual air in the ordinary type of insulation so as to eliminate the deterioration due to ionization, and yet to provide a cushion of gas which will prevent the stretching of the lead sheath under load conditions and enable the ordinary type of insulation to be operated at stresses and tmperatures approximating those now used in oil-filled insulation. I accomplish this result by modifying the evacuation and impregnation process so that all of the residual gas within the insulation is nitrogen, an inert and harmless gas. Nitrogen is selected for the purpose because it is only slightly soluble in the insulating oils that are used for impregnating the insulation and is inert and harmless. Any other inert gas which is only slightly soluble in the insulating oil used for impregnating the cable might be used. I propose to modify the usual process of evacuation and impregnation used for the ordinary type of insulation so that, as completed, the insulation will contain a modicum of entrained nitrogen gas, in addition to the amount which is absorbed by the impregnating oil. At room temperature and pressure, the impregnating oil will absorb about 7 per cent of its volume of nitrogen, while at a temperature of 85° C. and a pressure of 15 pounds per square inch above atmospheric it will absorb about 11 per cent. A cushion of 4 per cent of nitrogen is effective to prevent distension of the sheath with changes in pressure due to temperature changes. With the pressure of 15 pounds long continued, the nitrogen would be largely absorbed by the oil and still further reduce the internal pressure of the sheath.

Nitrogen gas is selected for this purpose because the total amount of gas required is about 11 per cent as a maximum and we have already discovered by experience that 10 per cent of $CO_2$ in oil-filled cable is quite harmless. As nitrogen is equally inert, it appears that 11 per cent of nitrogen will have no harmful effects.

Nitrogen is favored in place of $CO_2$ because the impregnating oil will absorb about 100 per cent of the latter gas. In order to get 4 per cent of entrained $CO_2$ to act as a cushion to prevent the stretching of the lead sheath, it would first be necessary to have the oil absorb 100 per cent of its volume of $CO_2$, and this appears to be quite undesirable in the absence of any definite information as to the behavior of an oil containing such a large amount of absorbed gas.

The proper proportion of nitrogen gas in the impregnating compound would be maintained under conditions of operation by having the joints filled with a similar insulating oil saturated with nitrogen. If found desirable, there could be connected to each such joint a constant volume reservoir partly filled with nitrogen-saturated oil the remainder being filled with pure dry nitrogen gas under pressure, as disclosed in the pending application of Herman Halperin and Alexander P. Thoms, Serial No. 509,320, filed January 17, 1931, to which reference may be made for a further description of the advantage of using such arrangements.

In the practical application of my invention, the evacuating and impregnating process at the factory would be modified so that it would be essentially as follows: After the wrappings of paper tape are applied to the conductor, the insulated conductor is placed on suitable reels and placed in the tank used for drying, evacuating, and impregnating. Heat and vacuum is applied so as to eliminate the moisture and reduce the residual air to as low an amount as practicable. Then nitrogen gas is admitted to the tank and again evacuated, thus washing out the residual air. This process of additional applications of nitrogen subsequently followed by evacuation may be repeated, if necessary, to reduce the residual oxygen remaining within the insulation to an innocuous amount. The amount of nitrogen within the tank is then adjusted to a suitable amount so that, upon admission to the impregnating tank of the impregnating oil the proper amount of residual nitrogen will be entrained in the insulation. Additional nitrogen may be admitted to the impregnating tank to maintain the saturation of the oil with nitrogen as the process of impregnation proceeds with the pressure within the tank gradually approaching atmospheric. The pressure may also be raised above atmospheric pressure to improve the impregnation.

During the transfer to the lead press, the impregnated, insulated conductors should, as far as possible, be kept submerged in nitrogen-saturated oil and, when the leading and trailing end of the cable comes through the lead press, an expansible and contractable reservoir containing nitrogen-gas or nitrogen-saturated impregnating oil may be attached to complete the impregnation of the insulation during the cooling which follows. A similar tank of nitrogen-saturated oil with an excess of nitrogen under pressure may be attached to one or both ends of the cable during shipment to provide for the expansion and contraction of the oil with temperature changes previous to the installation of the cable.

While I have, for simplicity, described single-conductor type of cable with ordinary insulation, it will be apparent to anyone skilled in the art that the process is equally applicable to multiple-conductor cables. It will also be equally apparent to one skilled in the art that the same process can be applied to oil-filled cable which is to be used in connection with a system of rigid constant-volume tanks connected to the oil channels in the cable, these tanks being partially filled with nitrogen-saturated oil and the remainder filled with nitrogen gas under pressure as disclosed in the pending application of the inventor filed February 24, 1931, Serial No. 517,788.

The single figure of drawing is a diagrammatic view, partly in section, illustrating a cable of my improved construction upon a cable reel.

For the purpose of illustration I have here shown a singe conductor cable which incorporates the principles of my invention. It is however to be understood that the invention is not limited to single conductor cables, but is equally applicable to multi-conductor cables. The cable comprises an inner conductor 1 having a wrapped paper insulation 2 which is suitably impregnated with nitrogen saturated insulating compound and has about three or four per cent of free nitrogen gas entrained therein in the form of minute bubbles dispersed throughout the insulation. The compound used is preferably a high grade thin oil which remains fluid at all operating temperatures of the cable. The cable is wound on a drum in the usual manner, an expansible reservoir 5, which is filled with nitrogen saturated compound, being connected to one end of the cable. This reservoir is attached to the end of the cable as the cable leaves the lead press, thereby supplying insulating compound to the cable as the cable cools. This reservoir may be dispensed with if desired, or, it may be used only until the cable has cooled to room temperature after leaving the press. Such a reservoir may be dispensed with during shipment since the nitrogen entrained within the compound in the cable will prevent the drawing of a high vacuum within the cable.

In compliance with the requirements of the patent statutes I have herein shown and described a preferred form of my invention. It is however to be understood that the invention is not limited to the precise form herein shown since this is merely illustrative of the general principles of my invention.

What I consider new and desire to secure by Letters Patent is:—

1. A high voltage cable including an oily impregnating dielectric having dispersed throughout a substantial amount of entrained inert gas which is devoid of free oxygen and which is slightly soluble in the impregnating dielectric.

2. A high voltage cable including an outer sheath, an inner conductor, and between the two wound insulation impregnated with an oily dielectric which is liquid through at least the major portion of the operating temperature range of the cable and which is devoid of free oxygen, said dielectric being substantially saturated with nitrogen gas in solution, and having dispersed throughout the dielectric minute particles of entrained nitrogen gas in an amount approximating four per cent by volume at the lower operating temperature range of the cable.

3. A high voltage cable including an oily dielectric devoid of free oxygen and having a substantial amount of entrained nitrogen gas dispersed throughout, and an expansible and contractible reservoir filled with the dielectric under pressure connected to and providing a seal for the end of the cable.

In witness whereof, I hereunto subscribe my name this 27th day of May, 1931.

DENNEY W. ROPER.